Feb. 17, 1948.   C. E. DEARDORFF   2,436,140
FIBERBOARD CREAM SEPARATING MILK CONTAINER
Filed July 17, 1944
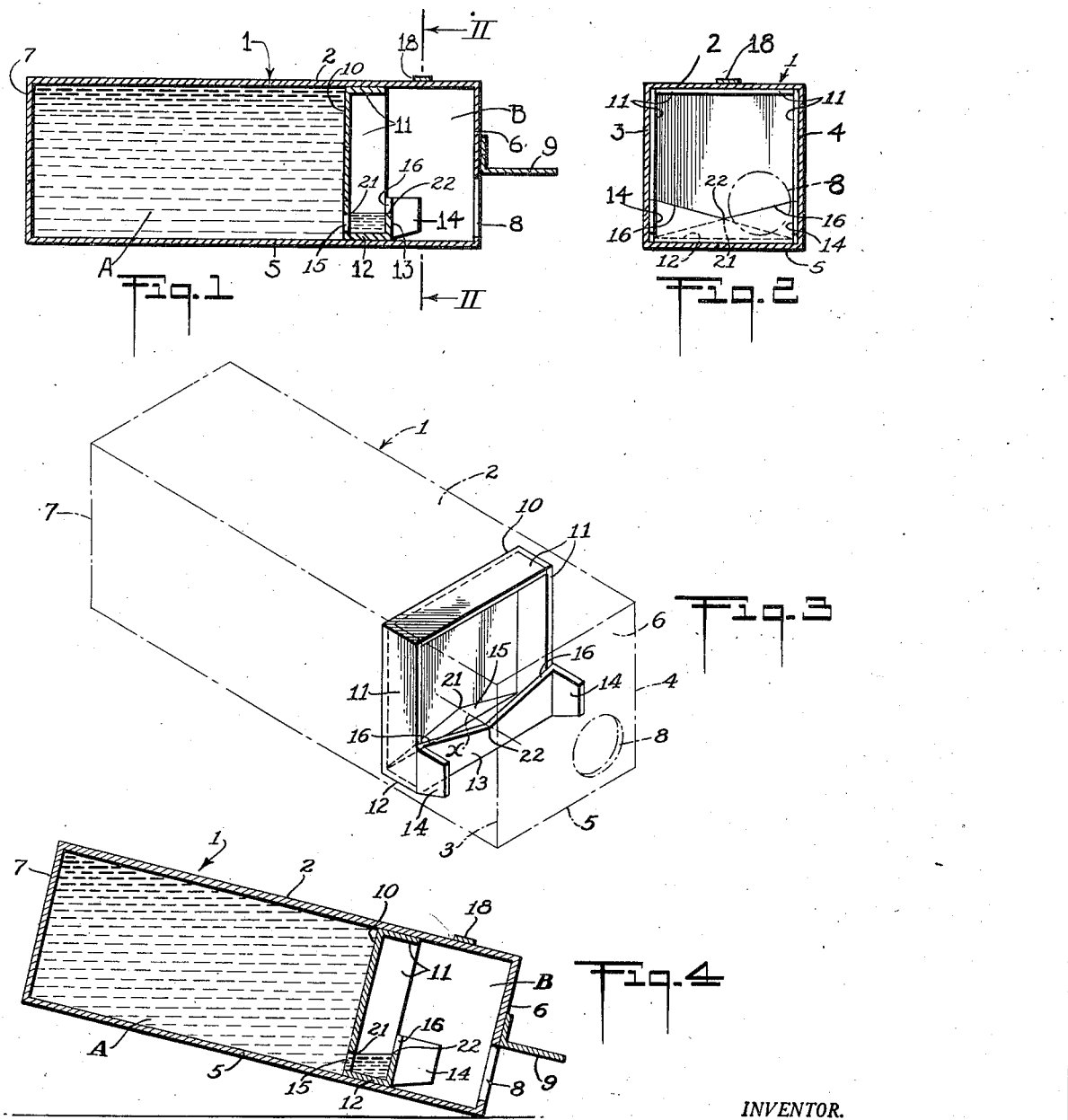
INVENTOR.
CLARENCE E. DEARDORFF
BY
Murry, Liddy & Glaceary
ATTORNEYS Patented Feb. 17, 1948

2,436,140

UNITED STATES PATENT OFFICE

2,436,140

FIBERBOARD CREAM SEPARATING MILK CONTAINER

Clarence E. Deardorff, Sacramento, Calif., assignor to C. E. Deardorff, Inc., a corporation of California Application July 17, 1944, Serial No. 545,356

6 Claims. (Cl. 229—15)

The present invention relates to improvements in a cream separator, and it consists of the combinations, constructions and arrangements hereinafter described and claimed.

An object of my invention is to provide a cream separator which is an improvement over the form of the invention shown in my Patent No. 2,399,665 on a Cream separator, issued May 7, 1946. In the patent mentioned, the cream separator is shown with a partition placed at the cream line in the container, this partition being of less area than the cross sectional area of the carton so that one edge of the partition is spaced away from the adjacent wall of the carton to provide an opening between the milk and cream compartments. A ledge of substantially the same area as this opening is placed in front of the partition and has its upper edge lying in a plane that substantially coincides with the partition edge, the plane also extending parallel with the longitudinal axis of the carton.

In the present form of the invention I have made the ledge a part of the partition and the partition has an opening that is shielded by the ledge.

The partition is placed at the cream line with a V-shaped slot therein, the vertex of the V being disposed at the middle of the partition and the edges coinciding with the carton corners. A ledge is used in combination with the partition and has a V-shaped edge facing in the opposite direction to the edge of the partition.

Other objects and advantages will appear in the following specification, and the novel features of the device will be particularly pointed out in the appended claims.

My invention is illustrated in the accompanying drawing forming a part of this application, in which:

Figure 1 is a longitudinal section through the container showing the cream separator;

Figure 2 is a transverse section taken along the line II—II of Figure 1;

Figure 3 is an isometric view of the partition and ledge, shown placed in a phantom milk container; and Figure 4 is a view similar to Figure 1, but illustrates how the container can be tilted beyond a horizontal position when the ledge vertex overlaps the vertex in the partition opening.

While I have shown only the preferred form of my invention, it should be understood that various changes or modifications may be made within the scope of the appended claims without departing from the spirit and scope of the invention.

In carrying out my invention I provide a container which may be a carton 1 designed to hold a quart of liquid, such as milk. The carton may be of any size or shape desired and is shown rectangular in Figure 1. The container may hold a liquid other than milk, and has four walls, 2, 3, 4 and 5, a top 6 and a bottom 7. The top 6 is provided with an outlet opening 8 adjacent to the corner of the container formed by the walls 4 and 5. A closure 9 is designed to cover the opening 8.

My invention is a unitary cream separator insertable into the carton and it includes a partition 10 that extends across the container and is placed at the cream line. The partition has three side flaps 11 that are glued or otherwise secured to the walls 2, 3 and 4 of the container. Another flap 12 is secured to the wall 5 and has an integral ledge 13 that is disposed parallel with the plane of the partition 10. The ledge 13 is secured in place by flaps 14 which are secured to the side walls 3 and 4.

Where it is desired to permit a slight angular inclination of the carton 1 to be maintained during the pouring of cream from the upper compartment B, I provide the partition 10, see Figures 2 and 3, with a V-shaped opening. The apex 21 of the opening 15 is disposed midway between the walls 3 and 4 of the carton, while the extremities of the opening substantially lie at the two carton corners made by the walls 3 and 4 with the wall 5. The ledge 13 is placed in front of and parallel to the partition and has a V-shaped edge 16 whose apex 22 coincides with a line X, see Figure 3, that parallels the longitudinal axis of the container and passes through the apex 21. The inclined edges 16 constitute the two extreme cream-pouring positions that can be assumed by the carton, when rocked about its longitudinal axis.

For example, when looking at Figure 2, the right-hand edge 16 can be swung angularly while the carton is maintained in a substantially horizontal position until this edge reaches a horizontal position. Only cream will be dispensed from the cream compartment B. The same holds true when the container is rocked in a counter-clockwise direction to bring the left-hand edge 16 into a horizontal position. A container of this type need not be held so that the bottom wall 5 is strictly in a horizontal position. A slight rocking of the container is permitted without the milk escaping from the milk compartment during the pouring operation.

When milk is poured through the opening 8 to fill the carton, the slot 15 will permit the milk to enter the lower compartment A as rapidly as the milk enters the opening. The partition and ledge will not interfere with the filling of the container with milk or with any other liquid. The compartment B will also be filled with milk. It should be understood that if the carton is made of cardboard or other fibrous material, it will be coated interiorly and exteriorly with wax to make it liquid proof. The slot 15 is large enough to permit a wax coating to be applied to all interior surfaces in the milk compartment.

After the container has been filled with milk and allowed to stand in a vertical position for an appreciable length of time, the cream will rise to the top and fill the cream compartment B, while the milk will fill the compartment A. When it is desired to pour only the cream from the compartment B, the cover 9 is opened and the container is tipped into substantially a horizontal position, care being taken that the mark 18 is at the top of the container. A vacuum will be created in the milk compartment A of sufficient force to hold the milk from passing through the slot 15 and over the ledge 13. In actual practice the liquid in the cream compartment will pour out through the outlet 8 and there will be a level of liquid in the cream compartment lying flush with the vertex 22 of the ledge and extending back to the partition. All of the milk will be retained in the compartment A, while all of the cream will be dispensed from the compartment B.

In order to dispense milk from the carton shown in Figure 2, the carton can be rocked until the wall 4 is placed at the bottom of the compartment. When this occurs, the slot 15 will be swung into a vertical position and air will enter the lower milk compartment A to permit milk to flow therefrom. The outlet opening 8 is indicated at the corner formed by the walls 4 and 5.

In the form of the device shown, the ledge whether separate or integral with the cover cooperates with the partition opening to create the vacuum in the milk compartment A when the marker 18 is held uppermost and the container maintained in pouring position. The use of a ledge spaced from the partition and toward the container top, will not interfere with the filling of the carton because there is ample space for the milk to pass around the ledge and into the lower compartment. Any quantity of milk may be poured from the compartment A up to the entire contents of the compartment and the pouring can be stopped at any time by merely rocking the carton about its longitudinal axis back into a position where the wall 1 and the marker 18 will be disposed uppermost. The ledge 13 can have its edge 16 extending slightly above or below the position shown in Figure 1 and still the device will function properly. In fact when the apex 22 of the edge 16 extends above the apex 21 of the opening 15 so that the apex 22 is disposed a greater distance away from the wall 5 than the apex 21, as shown in Figure 4, the carton 1 can be tilted slightly beyond the horizontal cream-pouring position so that substantially all of the cream will be dispensed from the compartment B. It is possible to tilt the container when the ledge overlaps the partition opening until the liquid level between the ledge and partition reaches the ledge vertex 22. In fact from actual practice it is possible to tilt the container even beyond this inclined position because the air to release the vacuum in compartment A must bubble under the partition vertex 21 and the container can be tilted into a greater inclined position than that shown in Figure 4, before this will happen.

I claim:

1. The combination with a carton having four sides and a top with an outlet opening therein, of a transverse partition dividing the carton into two compartments, said partition having three edges contacting three of the carton sides and having a fourth edge V-shaped with the apex of the V spaced from the fourth side to provide a fluid passage between the compartments, a ledge paralleling the partition and placed in the compartment closed by the carton top, said ledge extending inwardly from the fourth carton side and contacting with the carton sides disposed adjacent to the fourth side, said ledge having a concave V-shaped edge facing in the opposite direction of the V-shaped edge of the partition, the apex of the ledge concave edge lying in a line that parallels the carton sides and that substantially coincides with the apex of the partition V-shaped edge, and means on the carton for indicating the position in which the carton must be held to dispose the ledge at the underside of the carton when the latter is held in pouring position.

2. The combination with a carton having four sides and a top with an outlet opening therein, of a transverse partition dividing the carton into two compartments, said partition having three edges contacting three of the carton sides and having a fourth edge V-shaped with the apex of the V spaced from the fourth side to provide a fluid passage between the compartments, a ledge paralleling the partition and placed in the compartment closed by the carton top, said ledge extending inwardly from the fourth carton side and contacting with the carton sides disposed adjacent to the fourth side, said ledge having a concave V-shaped edge facing in the opposite direction to the V-shaped edge of the partition, the central portion of the ledge overlapping the vertex of the partition edge.

3. The combination with a carton having four side walls and a top with an outlet opening therein, of a transverse partition dividing the carton into two compartments, said partition extending from three side walls and part way across the carton so as to have the central portion of one edge spaced from the remaining side wall for providing a fluid passage between the compartments, a ledge paralleling the partition and placed in the compartment closed by the carton top, said ledge extending inwardly from the remaining said side wall which is spaced from the partition and the two adjacent side walls, and having its free edge concave and V-shaped, the bottom of the V being spaced substantially the same distance from the said remaining wall as the central portion of the edge of the partition.

4. The combination with a carton having four side walls and a top with an outlet opening therein, of a transverse partition dividing the carton into two compartments, said partition extending from three side walls and part way across the carton so as to have the central portion of one edge spaced from the remaining side wall for providing a fluid passage between the compartments, a ledge paralleling the partition and placed in the compartment closed by the carton top, said ledge extending inwardly from the remaining said side wall which is spaced from the partition and the two adjacent side walls, and having its free edge concave and V-shaped, the bottom of the V being spaced substantially the same distance from the said remaining wall as the central portion of the edge of the partition, and means on the carton for indicating the position in which the carton must be held to dispose the ledge at the underside of the carton when the latter is held in pouring position.

5. The combination with a carton having four sides and a top with an outlet opening therein, of a cream separator mounted in the carton and including a transverse partition dividing the carton into two compartments, said partition having three flaps secured to three of the carton sides and having a triangular opening with its base disposed adjacent to the fourth carton side, the apex of the opening being spaced from the fourth side to provide a fluid passage between the compartments, the separator having a ledge connected to the partition by a spacing member that is securable to the fourth carton side, the ledge paralleling the partition and being placed in the compartment closed by the carton top, the ledge extending inwardly from the fourth carton side and having flaps secured to the carton sides disposed adjacent to the fourth side, said ledge having a concave V-shaped edge facing in the opposite direction of the V-shaped portion of the partition opening, the apex of the ledge concave edge overlapping the apex of the partition opening.

6. The combination with a carton having four sides and a top with an outlet opening therein, of a cream separator mounted in the carton and including a transverse partition dividing the carton into two compartments, said partition having three flaps secured to three of the carton sides and having a triangular opening with its base disposed adjacent to the fourth carton side, the apex of the opening being spaced from the fourth side to provide a fluid passage between the compartments, the separator having a ledge connected to the partition by a spacing member that is securable to the fourth carton side, the ledge paralleling the partition and being placed in the compartment closed by the carton top, the ledge extending inwardly from the fourth carton side and having flaps secured to the carton sides disposed adjacent to the fourth side, said ledge having a concave V-shaped edge facing in the opposite direction of the V-shaped portion of the partition opening, the apex of the ledge concave edge overlapping the apex of the partition opening, and means on the carton for indicating the position in which the carton must be held to dispose the ledge at the underside of the carton when the latter is held in pouring position.

CLARENCE E. DEARDORFF.

REFERENCES CITED

The following references are of record in the file of this patent:

UNITED STATES PATENTS

| Number | Name | Date |
|---|---|---|
| 731,357 | Griffith | June 16, 1903 |
| 1,722,396 | Reiber | July 30, 1929 |
| 1,820,549 | Williams | Aug. 25, 1931 |
| 2,321,660 | Courtney | June 15, 1943 |
| 2,324,670 | Bergen | July 20, 1943 |

FOREIGN PATENTS

| Number | Country | Date |
|---|---|---|
| 462,160 | Great Britain | Mar. 3, 1937 |